3,024,272
Patented Mar. 6, 1962

3,024,272
ORGANIC ACID SALTS OF BASIC AMINO ACIDS AND THEIR USE
Archibald Miller Hyson and William Haworth Todd, Wilmington, Del., assignors to E. I. du Pont de Nemours and Company, Wilmington, Del., a corporation of Delaware
No Drawing. Filed Apr. 22, 1958, Ser. No. 730,054
1 Claim. (Cl. 260—501)

This invention relates to salts of the basic amino acids and organic acids, methods of their preparation and uses therefor, and is more especially related to lysine propionate, its preparation and use as a combination mold inhibitor and fortifying agent for baked goods.

It is well known that comestibles, pharmaceuticals, cosmetics, and forage materials deteriorate on standing in contact with air by loss of flavor, potency and/or odor, frequently to such an extent that they become wholly unsuitable for ingestion or use. A number of patents have issued which provide means of extending the useful life of some of these products, and for the most part these patents describe the use of various types of antioxidants such as: the beta-substituted-mercaptopropionic acids and their esters—U.S. 2,397,960 of M. F. Gribbins et al., issued April 9, 1946; U.S. 2,397,976 to D. K. O'Leary, issued April 9, 1946; and U.S. 2,416,052 to M. F. Gribbins, issued February 18, 1947; nordihydroguaiaretic acid—Brazil Patent 34,370, and compounds having the formula $HN=C(NHR)R'$ in which R and R' are H, alkyl, acyl, alkylol, $NH_2$, OH, $CONH_2$, CN, esterified carboxyl, guanido or $CONHNH_2$—Danish Patent 64,773; and metallo organic salts of U.S. 2,154,449 and U.S. 2,190,449. These antioxidants vary in their effectiveness but they all, by and large, have little, if any, biological value. The desirability of providing adjuvants having more effective biological value is apparent. The invention, as a principal object, provides such adjuvants.

Another object of the invention is to provide new compositions of matter. A further object is to provide uses for such compositions. Yet another object is to provide a method for the prevention of mold growth in or on food products and especially in or on foods for human consumption. Still another object is to provide new products having enhanced nutritive value as well as mold growth resistance. Other objects and advantages of the invention will hereinafter appear.

The compositions of the invention are organic acid salts of the basic amino acids. The organic acids from which the salts are made contain from 1 to 5 carbon atoms in the organic acid molecule and include particularly such acids as acetic, propionic, butyric, and valeric acids. The basic amino acids from which the salts are made include levo- and/or dextro-rotary and/or D-L (racemic) lysines, arginines and histidines as well as their peptides. Of these salts the invention is directed especially to L-lysine propionate because of its availability, exceptional utility and important properties for animals and especially *Homo sapiens*. (See article by H. R. Rosenberg et al., "Archives of Biochemistry and Biophysics," vol. 37, 2, 1952, pp. 461–468.)

EXAMPLE I

An aqueous solution of lysine (27%) of pH 9.65 is treated with propionic acid to a pH of 6.5. Acetone is added in excess and lysine propionate precipitated as an oily residue from which most of the water and acetone were decanted. The lysine propionate is allowed to dry partially in air for two days and is finally completely dried over concentrated sulfuric acid in a vacuum desiccator. The dried lysine propionate is a brittle solid (M.P. 162–164° C.) which is somewhat hygroscopic. When the product is treated with concentrated sulfuric acid and warmed, fumes of propionic acid are evolved. Lysine propionate prepared in this way was found to contain 12.43% nitrogen. Theoretical=12.73%. Hence, the product obtained corresponds to the structure shown below:

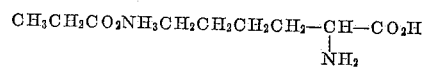

EXAMPLE II

L-Lysine Propionate

To 80 ml. of concentrated L-lysine solution, containing 42.72 g. (0.292 mole) of L-lysine, is added 21.60 g. (0.292 mole) of propionic acid. The resulting, warm solution is swirled with charcoal, filtered through a bed of Celite and vacuum drum dried. After recrystallization from a solution of methanol and ethanol, the salt is found to melt between 163 and 166° C. and has the following analysis.

Calcd. for $C_9H_{20}N_2O_4$: C, 49.09; H, 9.09; N, 12.72. Found: C, 49.19; H, 9.17; N, 12.96.

EXAMPLE III

L-Lysine Valerate

A solution is prepared by diluting 20 ml. of L-lysine concentrate containing 10.68 g. (0.073 mole) of L-lysine, with 25 ml. of water and adding 7.45 g. (0.073 mole) of n-valeric acid. Following decoloration with charcoal, the solution is concentrated to dryness using a Rinco evaporator. The resulting salt is recrystallized from methanol-ethanol mixtures. It does not melt, but begins to discolor at 185° C., becoming a black char by 230° C. This salt analyzes as follows.

Calcd. for $C_{12}H_{24}N_2O_4$: C, 53.22; H, 9.67; N, 11.29. Found: C, 52.82; H, 9.81; N, 11.31.

EXAMPLE IV

L-Arginine Propionate

An aqueous solution of L-arginine propionate is prepared by adding 10 g. (0.057 mole) of L-arginine to a mixture of 4.22 g. (0.057 mole) of propionic acid in 40 ml. of water. Evaporation of the solution to dryness gives a hydrated form of L-arginine propionate, melting first at 102–104°, and then crystallizing to melt a second time at 183–186°. Alternatively the hydrate may be dehydrated by recrystallization from a mixture of methanol and ethanol to yield a salt melting over the range 167–215° and having the following analysis.

Calcd. for $C_9H_{20}N_4O_4$: C, 43.54; H, 8.06. Found: C, 43.71; H, 8.23.

Amino acid salts of the organic acids generally may be made in accord with the process of Example I. The resulting salts have many important uses as food supplements. The L-lysine propionate performs a dual role in food products, (1) as a mold inhibitor and (2) as a food supplement. Applicant has demonstrated the fungistatic properties of this salt. It has long been known that baked goods and especially raised dough breads are somewhat deficient in the essential amino acid, L-lysine. The principal product of the invention, L-lysine propionate, supplies the latter deficiency and also inhibits mold growth.

EXAMPLE V

Lysine Propionate as an Inhibitor of Mold Growth in Bread

A typical example is the following in which L-lysine propionate is incorporated in a bread batch, the bread described being typical of those white breads showing a pH of from about 5.1 to 6.0. In making the bread dough a sponge containing 120 parts of flour, 82 parts of water, 3 parts of yeast and 1 part of yeast food is made and set at 78° F., to ferment for four and one-quarter hours. It is then made into a dough batch along with the following ingredients:

| | Parts |
|---|---|
| Flour | 60 |
| Water | 33 |
| Sugar | 9 |
| Powdered skim milk | 6 |
| Shortening | 5½ |
| Salt | 3⅓ |
| Malt extract | 2 |
| L-lysine propionate | ¾ |

The dough is mixed for 8 to 10 minutes at 80° F., and allowed to ferment ¾ of an hour before making into loaves. The L-lysine propionate, above specified, is in the ratio of ¾ part to 115 pounds of water. After the bread is baked and cooled, four loaves are inoculated on the surface with spores of *Aspergillus niger*, a common bread mold. The loaves are sealed in cellophane and stored at 80° F. and 85% relative humidity. No mold appeared on the surface of the loaves so made until after eight days had elapsed. Where no mold inhibitor is added to the bread, mold appears in three to four and one-half days under the same conditions.

EXAMPLE VI

*Lysine Propionate as an Inhibitor for Mold Growth*

In another bake, the quantity of L-lysine propionate used is 4.8 oz./100 lbs. of flour. After the same treatment described above (Example V), the loaves were stored at 78° F. and 85% relative humidity. No mold appeared on the lysine propionate-containing loaves until five and one-half days had elapsed, while mold appeared in four days on loaves containing no L-lysine propionate.

EXAMPLE VII

*Lysine Butyrate as an Inhibitor of Mold Growth in Bread*

The procedure used was the same as that in Example V for L-lysine propionate. The quantity of lysine butyrate added was approximately ⅘ of a pound with the same formula as shown in Example V. In addition, controls were run simultaneously containing equivalent molar quantities of L-lysine hydrochloride (ca. ⅗ of a pound).

The control loaves containing the L-lysine hydrochloride were all moldy in 5½ days while those containing L-lysine butyrate were not moldy after 8 days.

EXAMPLE VIII

*Arginine Propionate as an Inhibitor of Mold Growth in Bread*

The procedure used was the same as that in Example V for L-lysine propionate except that a storage temperature of 85° F. and 85% relative humidity was used for the bread after innoculation. The quantity of arginine propionate used was approximately 9/10 of a pound based on the formula used in Example V. In addition, controls were run simultaneously containing equivalent molar quantities of arginine.

The control loaves containing the arginine were moldy in 3½ days while those containing the arginine propionate required 5 days for the appearance of mold.

The quantity of the inhibitor, lysine propionate or equivalent basic amino acid salt of propionic acid required to produce the optimum mold inhibiting effect, is varied by, among other things, the specific pH value of the thing treated. Generally speaking, however, an amount of the salt, for bread and baked goods, should equal from about 0.01% to about 2.5% based on the flour content, and .2% to 1.0% is preferred for protecting materials having a pH 3 to 7 against mold formation.

The salt may be applied (as a solid or in solution) in any way appropriate to the material treated. If a surface is to be treated, as, for example, the surface of a foodstuff or other material susceptible to mold or the surface of a container or utensil used in the processing or handling of carbohydrates or other food materials or products, it may be sprayed with a solution of inhibitor of the proper concentration and pH value. If the inhibitor is to be incorporated in the processing of a food product such as bread, it may be added to the ingredients before, during, or after the mixing. For example, it may be added as a solution to the batch of bread dough or icing or it may be mixed dry with or sprayed on flours, or meal or cereals. It may be admixed with or sprayed into sweet butter, pastries, custards or confections, cream cheese, cheese spreads, cattle feed, etc. It may be applied to fruits, such as oranges, bananas, pineapples, grapes, apples, pears, by spraying or dipping.

The use of the organic acid salts of the essential amino acid, L-lysine, not only increases the level of essential food nutrients but also restricts mold growth in foods for animal consumption, and, in addition, provides nitrogen supplements for cattle, chickens, and the like, thereby improving food production.

We claim:

L-lysine propionate.

References Cited in the file of this patent

UNITED STATES PATENTS

| | | |
|---|---|---|
| 2,154,449 | Hoffman | Apr. 18, 1939 |
| 2,236,867 | Bunzell | Apr. 1, 1941 |
| 2,662,046 | Howe | Dec. 8, 1953 |
| 2,697,116 | Strayner | Dec. 14, 1954 |
| 2,812,350 | Niederhauser | Nov. 5, 1957 |

OTHER REFERENCES

Jukes et al.: "J. Biol. Chem.," vol. 110, pages 9–16 (1935).

Lamprecht: "Brot u. Gebäck," vol. 9, pages 26–30 (1955), C.A., vol. 50, 17228.